United States Patent
Kulka et al.

(10) Patent No.: US 11,071,317 B2
(45) Date of Patent: Jul. 27, 2021

(54) SWEETNESS ENHANCEMENT

(71) Applicant: Givaudan, S.A., Vernier (CH)

(72) Inventors: Hedy Kulka, Baltimore, MD (US); Ioana Maria Ungureanu, Cincinnati, OH (US)

(73) Assignee: GIVAUDAN S.A., Vernier (CH)

( * ) Notice: Subject to any disclaimer, the term of this patent is extended or adjusted under 35 U.S.C. 154(b) by 651 days.

(21) Appl. No.: 15/769,825

(22) PCT Filed: Oct. 20, 2016

(86) PCT No.: PCT/EP2016/075210
§ 371 (c)(1),
(2) Date: Apr. 20, 2018

(87) PCT Pub. No.: WO2017/068034
PCT Pub. Date: Apr. 27, 2017

(65) Prior Publication Data
US 2020/0245661 A1    Aug. 6, 2020

Related U.S. Application Data

(60) Provisional application No. 62/244,808, filed on Oct. 22, 2015.

(51) Int. Cl.
*A23L 27/30* (2016.01)
*A23L 2/60* (2006.01)
*A23C 9/13* (2006.01)

(52) U.S. Cl.
CPC ............ *A23L 27/33* (2016.08); *A23C 9/1307* (2013.01); *A23L 2/60* (2013.01); *A23V 2002/00* (2013.01)

(58) Field of Classification Search
CPC .......... A23L 2/60; A23L 27/33; A23C 9/1307

USPC ................................................. 426/658, 660
See application file for complete search history.

(56) References Cited

U.S. PATENT DOCUMENTS

| | | |
|---|---|---|
| 2012/0021111 A1 | 1/2012 | Pfister et al. |
| 2014/0248411 A1 | 9/2014 | Rhyu et al. |
| 2015/0018432 A1 | 1/2015 | Prakash et al. |

FOREIGN PATENT DOCUMENTS

| | | | |
|---|---|---|---|
| JP | 2009142187 A | * | 7/2009 |
| JP | 2011-026411 A | | 2/2011 |
| JP | 2014-156404 A | | 8/2014 |
| WO | WO 2012/169661 A1 | | 12/2012 |
| WO | WO 2016/116619 A1 | | 7/2016 |
| WO | WO 2016/116620 A1 | | 7/2016 |
| WO | WO 2016/116627 A1 | | 7/2016 |

OTHER PUBLICATIONS

PCT/EP2016/075210—International Search Report, dated Jan. 23, 2017.
PCT/EP2016/075210—International Written Opinion, dated Jan. 23, 2017.

* cited by examiner

*Primary Examiner* — Jyoti Chawla
(74) *Attorney, Agent, or Firm* — Curatolo Sidoti Co., LPA; Salvatore A. Sidoti; Floyd Trillis, III

(57) ABSTRACT

A method of enhancing sweetness in a low-intensity sweetener-containing comestible composition of reduced low-intensity sweetener content, comprising the addition thereto of a sweetness-enhancing proportion of cellobiose. The method allows the proportion of undesirable low-intensity sweetener, such as sugar and high fructose corn syrup, to be reduced, while retaining a desired sweetness level.

6 Claims, No Drawings

SWEETNESS ENHANCEMENT

CROSS REFERENCE TO RELATED APPLICATIONS

This application is a national stage application of International Application No. PCT/EP2016/075210, filed 20 Oct. 2016, which claims priority from U.S. Provisional Patent Application No. 62/244,808, filed 22 Oct. 2015, which applications are incorporated herein by reference.

This disclosure relates to sweetness enhancement.

Sweetness in comestible products, that is products intended to be taken by mouth either for permanent ingestion or temporarily for expectoration, is often a desirable characteristic. Traditionally, sweetness has been provided by the addition of a low-intensity sweeteners (LIS). The best-known and most widely used of these has been sugar (sucrose), but other sugars (such as fructose and glucose) and high-fructose corn syrup and honey also enjoy widespread use. These LIS, especially sucrose, have the advantage of delivering considerable sweetness without any undesirable aftertaste. However, it is desired to use less LIS in health or dietary foods, which means in turn the possibility of a drop in sweetness that is unacceptable to consumers.

One way around this is the use of high-intensity sweeteners (HIS). These materials, which may be natural or artificial, have a sweetness which can be several hundred times that of sucrose, and can thus theoretically stand in for a much larger quantity of sweetener. Examples of typical HIS include saccharin, cyclamate, aspartame, stevioside, rebaudioside A ("Reb A") and sucralose. These substances generally have the drawback that they impart undesirable off-tastes to comestible products, typically bitter, metallic or licorice tastes, or an undesirable lingering sweetness.

It has now been found that the LIS content in comestible compositions can be reduced, without the need for high-intensity sweeteners. There is therefore provided a method of enhancing sweetness in a low-intensity sweetener-containing comestible composition of reduced low-intensity sweetener content, comprising the addition thereto of a sweetness-enhancing proportion of cellobiose.

Cellobiose is a disaccharide of the formula

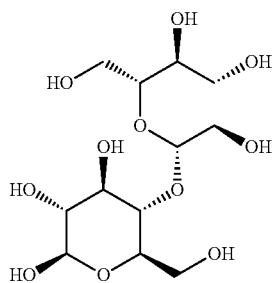

It is an enzymatic degradation product of cellulose, and it is readily commercially available. It has a number of pharmacological uses. Cellobiose itself is not sweet—4% cellobiose is rated to be as sweet as 1.25% sucrose, and sweetness below 1.5% sucrose is accepted as being "not intrinsically sweet" by FEMA (the Flavor and Extract Manufacturers' Association, which sets the standards for acceptability of new materials in comestible products). It is therefore surprising that it should have any effect on the sweetness of a sugar-containing comestible product.

In a further surprising development, cellobiose provides a number of further advantageous properties and attributes:

(a) A desirable characteristic in any sweet comestible product is that, not only should it be sweet overall, but also that it should deliver an immediate sensation of sweetness. This is often referred to in the art as "upfront sweetness". It is a characteristic that is noticeable in LIS such as sugar (sucrose), fructose, glucose, high fructose corn syrup and honey, but which is often lacking (sometimes considerably) in HIS or in mid-calories applications such as reduced (30-70%) sugar. It is surprising to find that the replacement of part of the LIS by cellobiose results in building back intrinsic qualities of full LIS products, such as sweetness enhancement, and pronounced upfront sweetness.

(b) The same is true of mouthfeel, that is, that the composition produces in the mouth a sensation of "fullness". LIS contributes to mouthfeel, but, for example, high-intensity sweeteners do not. The presence in a comestible composition of cellobiose with a reduction in LIS content results in the same mouthfeel as would have been given by the original LIS concentration, and therefore no reduction in consumer acceptance.

(c) The compensation by cellobiose for the reduction in LIS content means that the concentration of HIS sometimes considered necessary can be reduced. This in turn minimises the various undesirable off-tastes hereinabove mentioned. In addition, independent of its sweetness-adding function, it has been found that cellobiose is an effective off-taste blocker, that is, it prevents the perception of off-taste, as opposed to drowning it out by inherent greater sweetness (of which cellobiose itself has effectively none). The upfront sweetness and mouthfeel characteristics hereinabove mentioned are maintained even in the presence of these HIS materials, which are well known for their lack thereof.

There is therefore also provided a sweetened comestible product comprising a sweetened comestible product base, a reduced proportion of low-intensity sweetener and a sweetness-enhancing proportion of cellobiose.

By "reduced proportion of low-intensity sweetener" is meant a proportion of LIS less than that normally required to attain a desired level of sweetness with respect to the particular comestible product. This will naturally vary depending on the product involved, the level of LIS used and the level of sweetness involved, as will the proportion of cellobiose used.

In general, the cellobiose will be added at a rate of from 0.1-4.0% by weight of the final sweetened comestible product, particularly from 0.5-4% and more particularly from 1-4%.

Taking the particular example of sucrose, the proportion of cellobiose used will depend on the quantity of sucrose used and the level of sweetness desired. For example, a reduction in sucrose content by 1% by weight can be compensated by the addition of 1-2% cellobiose. As a general rule, an addition of 4% cellobiose will compensate for a sucrose reduction of 2%. Thus, a solution of 2% sucrose and 4% cellobiose will have similar sweetness and mouthfeel characteristics as a 4% sucrose solution. Similarly, a solution of 5% sucrose+4% cellobiose will have a very similar taste to a 7% sucrose solution, and a solution of 7% sucrose+4% cellobiose will have a very similar taste to a 9% sucrose solution.

By "sweetened comestible product base" is meant all the ingredients necessary for the comestible composition, apart from LIS and cellobiose. These will naturally vary in both nature and proportion, depending on the nature and use of the comestible composition, but they are all well known to the art and may be used in art-recognised proportions. The formulation of such a base for every conceivable purpose is therefore within the ordinary skill of the art.

The ingredients in a comestible composition base include, but are not limited to, anti-caking agents, anti-foaming agents, anti-oxidants, binders, colourants, diluents, disintegrants, emulsifiers, encapsulating agents or formulations, enzymes, fats, flavour-enhancers, flavouring agents, gums, lubricants, polysaccharides, preservatives, proteins, solubilisers, solvents, stabilisers, sugar-derivatives, surfactants, sweetening agents, vitamins, waxes, and the like. Solvents which may be used are known to those skilled in the art and include e.g. ethanol, ethylene glycol, propylene glycol, glycerine and triacetin. Encapsulants and gums include maltodextrin, gum arabic, alginates, gelatine, modified starch, and polysaccharides.

Natural and artificial high-intensity sweeteners may also be used, especially in health and dietary products. It is a particular feature of this disclosure that, because of the addition of cellobiose, the proportions used may be significantly lowered. All the well-known examples may be used, including saccharin, cyclamate, aspartame, stevioside, rebaudioside A ("Reb A") and sucralose.

Examples of additives, excipients, carriers, diluents or solvents for flavour or fragrance compounds may be found e.g. in "Perfume and Flavour Materials of Natural Origin", S. Arctander, Ed., Elizabeth, N.J., 1960; in "Perfume and Flavour Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Wash., 1988.

Non-limiting examples of such consumable products include:
  wet/liquid soups regardless of concentration or container, including frozen soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consommé) to sauces (cream or cheese-based soups);
  dehydrated and culinary foods, including cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology);
  meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes;
  meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen;
  beverages, including beverage mixes and concentrates, including but not limited to, alcoholic and non-alcoholic ready to drink and dry powdered beverages., carbonated and non-carbonated beverages, e.g., sodas, fruit or vegetable juices, alcoholic and non-alcoholic beverages, confectionery products, e.g., cakes, cookies, pies, candies, chewing gums, gelatins, ice creams, sorbets, puddings, jams, jellies, salad dressings, and other condiments, cereal, and other breakfast foods, canned fruits and fruit sauces and the like;
  milk, cheese, yoghurt and other dairy products.

The proportion of cellobiose will depend on the nature of the composition and the degree and kind of the sweetness enhancement and upfront sweetness enhancement desired. The skilled person can readily ascertain the appropriate proportion in every case with only simple, non-inventive experimentation. However, as a general indication, the proportion of cellobiose to be added will typically lie within the range of 0.1 to 10% particularly 0.4 to 5% and more particularly 0.5 to 4% although the flavourist may seek particular effects by working outside this range, and it should be regarded as an indication only.

EXAMPLE 1

4% cellobiose is not inherently sweet on its own in water.
20 sweet sensitive panelists ranked 4% cellobiose and sucrose standards (1% and 1.5%) for overall sweetness intensity over 2 replications for a total of 40 observations. 4% cellobiose was found by r-index analysis to be significantly less sweet than 1.5% sucrose in water and significantly more sweet than 1.0% sucrose in water (95% confidence level, p-value<0.05).

EXAMPLE 2

4% cellobiose in combination with 5% sucrose showed sweetness enhancement beyond an additive effect.
20 sweet sensitive panelists rank ranked 5% sucrose+4% cellobiose and sucrose standards (6%, 7% and 8%) in water for overall sweetness intensity over 2 replications for a total of 40 observations. 5% sucrose+4% cellobiose was found by r-index analysis to be not significantly different in sweetness intensity from 7% sucrose in water (95% confidence, p-value>0.05). The expected sucrose equivalence (SE) of 4% cellobiose on top of 5% sucrose would be 6.25% (1.25%+5%) but the perceived SE was 7%, showing true sweetness enhancement.

EXAMPLE 3

The addition of 4% cellobiose to a base consisting of 80 ppm Reb-A in water showed significantly increased upfront sweetness, significantly decreased delayed sweetness, significantly decreased lingering sweetness and significantly increased overall sweetness when compared to the unaltered 80 ppm Reb-A base. The test was carried out by a panel of 14 trained panelists. The panelists scored 4 descriptors (overall sweet, upfront sweet, delayed sweet and lingering sweet) on a 100-point scale over 4 replications for a total of 32 observations.

It was found that an aqueous solution of 80 ppm Reb-A and 4% cellobiose had the same sweetness as an aqueous solution of 150 ppm Reb-A. However, the former exhibited significantly increased upfront sweetness when compared to an isosweet 150 ppm Reb-A sample.

EXAMPLE 4

In a model beverage base consisting of water and 200 ppm of sucralose, cellobiose was tested at 2% for upfront sweetness enhancement and sweetness enhancement. Samples were evaluated by a panel of 7 expert tasters. Tasters were asked to compare the base (200 ppm of sucralose) with the model beverage (water, 200 ppm of sucralose, 2% cellobiose) focusing on the overall quality of sweetness, particularly on the enhancement of the upfront sweetness, overall sweetness intensity.

Base: sweet, lingering sweet and licorice
Base plus cellobiose: significant sweetness enhancement, upfront sweetness enhancement, rounded profile, decreased offnotes, better mouthfeel.

EXAMPLE 5

In a model beverage base consisting of water and 95 ppm of sucralose, cellobiose was tested at 2% for upfront sweetness enhancement and sweetness enhancement. Samples were evaluated by a panel of 8 expert tasters. Tasters were asked to compare the base (95 ppm of sucralose) with the model beverage (water, 95 ppm of sucralose, 2% cellobiose) focusing on the overall quality of sweetness, particularly on the enhancement of the upfront sweetness, overall sweetness intensity.

Base: medium sweetness, lingering sweet and licorice
Base plus cellobiose: significant sweetness enhancement, upfront sweetness enhancement, rounded profile, decreased offnotes, better mouthfeel.

EXAMPLE 6

In a model beverage base consisting of water and 5% of sucrose, cellobiose was tested at 0.1% for upfront sweetness enhancement and sweetness enhancement. Samples were evaluated by a panel of 9 expert tasters. Tasters were asked to compare the base (water with 5% of sucrose) with the model beverage (water, 5% of sucrose, and 0.1% cellobiose) focusing on the overall quality of sweetness, particularly on the enhancement of the upfront sweetness, overall sweetness intensity.

Base: medium sweetness
Base plus cellobiose: significant sweetness enhancement, rounded profile.

EXAMPLE 7

In a model beverage base consisting of water and 5% of sucrose, cellobiose was tested at 2% for upfront sweetness enhancement and sweetness enhancement. Samples were evaluated by a panel of 13 expert tasters. Tasters were asked to compare the base (water with 5% of sucrose) with the model beverage (water, 5% of sucrose, and 2% cellobiose) focusing on the overall quality of sweetness, particularly on the enhancement of the upfront sweetness, overall sweetness intensity.

Base: medium sweetness
Base plus cellobiose: significant sweetness enhancement, upfront sweetness enhancement, rounded profile, better mouthfeel.

EXAMPLE 8

In a model beverage base consisting of water and 7% of sucrose, cellobiose was tested at 2% for upfront sweetness enhancement and sweetness enhancement. Samples were evaluated by a panel of 6 expert tasters. Tasters were asked to compare the base (water with 7% of sucrose) with the model beverage (water, 7% of sucrose, and 2% cellobiose) focusing on the overall quality of sweetness, particularly on the enhancement of the upfront sweetness, overall sweetness intensity.

Base: medium sweetness
Base plus cellobiose: significant sweetness enhancement, upfront sweetness enhancement, rounded profile.

EXAMPLE 9

In a beverage model containing water, sodium benzoate (2000 ppm), sucralose (90 ppm), citric acid (500 ppm) and a lemon lime flavor (850 ppm), cellobiose was tested at 4% for upfront sweetness enhancement and sweetness enhancement. Samples were evaluated by a panel of 6 expert tasters. Tasters were asked to compare the base (water, 2000 ppm sodium benzoate, 90 ppm sucralose, 500 ppm citric acid, 850 ppm lemon lime flavor) with the model beverage (water, 2000 ppm sodium benzoate, 90 ppm sucralose, 500 ppm citric acid, 850 ppm lemon lime flavor, 4% cellobiose) focusing on the overall quality of sweetness, particularly on the enhancement of the upfront sweetness, overall sweetness intensity.

Base: medium sweetness
Base plus cellobiose: significant sweetness enhancement, upfront sweetness enhancement, , rounded aroma profile.

EXAMPLE 10

In a beverage model containing carbonated water, sodium benzoate (2000 ppm), Sucralose (90 ppm), citric acid (500 ppm) and a lemon lime flavor (850 ppm) cellobiose was tested at 4% for upfront sweetness enhancement and sweetness enhancement. Samples were evaluated by a panel of 7 expert tasters. Tasters were asked to compare the base (carbonated water, 2000 ppm sodium benzoate, 90 ppm Sucralose, 500 ppm citric acid, 850 ppm lemon lime flavor) with the model beverage (water, 2000 ppm sodium benzoate, 90 ppm Sucralose, 500 ppm citric acid, 850 ppm lemon lime flavor, 4% cellobiose) focusing on the overall quality of sweetness, particularly on the enhancement of the upfront sweetness, overall sweetness intensity.

Base: medium sweetness
Base plus cellobiose: significant sweetness enhancement, upfront sweetness enhancement, improved mouthfeel, rounded aroma profile.

EXAMPLE 11

In a beverage model containing water, sodium benzoate (2000 ppm), Reb-A (180 ppm), citric acid (500 ppm) and a lemon lime flavor (850 ppm) cellobiose was tested at 4% for upfront sweetness enhancement and sweetness enhancement. Samples were evaluated by a panel of 7 expert tasters. Tasters were asked to compare the base (water, 2000 ppm sodium benzoate, 180 ppm Reb-A, 500 ppm citric acid, 850 ppm lemon lime flavor) with the model beverage (water, 2000 ppm sodium Benzoate, 180 ppm Reb-A, 500 ppm citric acid, 850 ppm lemon lime flavor, 4% cellobiose) focusing on the overall quality of sweetness, particularly on the enhancement of the upfront sweetness, overall sweetness intensity.

Base: medium sweetness

Base plus cellobiose: significant sweetness enhancement, upfront sweetness enhancement, , improved mouthfeel, rounded aroma profile.

EXAMPLE 12

In a beverage model containing water, sodium benzoate (2000 ppm), Reb-A (180 ppm), citric acid (500 ppm) and a lemon lime flavor (850 ppm) cellobiose was tested at 4% for upfront sweetness enhancement and sweetness enhancement. Samples were evaluated by a panel of 8 expert tasters. Tasters were asked to compare the base (water, 2000 ppm sodium benzoate, 180 ppm Reb-A, 500 ppm citric acid, 850 ppm lemon lime flavor) with the model beverage (water, 2000 ppm sodium Benzoate, 180 ppm Reb-A, 500 ppm citric acid, 850 ppm lemon lime flavor, 4% cellobiose) focusing on the overall quality of sweetness, particularly on the enhancement of the upfront sweetness, overall sweetness intensity.

Base: medium sweetness

Base plus cellobiose: significant sweetness enhancement, upfront sweetness enhancement, , improved mouthfeel, rounded aroma profile.

EXAMPLE 13

Yoghurt RebA 180 ppm+4% cellobiose

In a plain zero-fat yoghurt, sweetened with rebaudioside A (180 ppm), cellobiose was tested at 4% for sweetness enhancement. Samples were evaluated by a panel of 6 expert tasters. Tasters were asked to compare the base (plain yoghurt+180 ppm RebA) with the model yoghurt (plain yoghurt, 180 ppm RebA 4% cellobiose) focusing on the overall quality of sweetness.

The model yoghurt was found to be much sweeter, with a significantly better overall balance and quality of sweetness than the base.

EXAMPLE 14

In a plain zero-fat yoghurt, sweetened with sucralose (90 ppm), cellobiose was tested at 4% for sweetness enhancement. Samples were evaluated by a panel of 6 expert tasters. Tasters were asked to compare the base (plain yoghurt+90 ppm sucralose) with the model yoghurt (plain yoghurt, 90 ppm sucralose, 4% cellobiose) focusing on the overall quality of sweetness.

The model yoghurt was found to be much sweeter, with a significantly improved balance and quality of sweetness than the base.

The invention claimed is:

1. A method of enhancing sweetness in a comestible composition of reduced low-intensity sweetener content, comprising the addition thereto of a sweetness-enhancing proportion of cellobiose, wherein the sweetener in the comestible composition consists of low-intensity sweetener, and wherein the cellobiose is added at a weight proportion of from 0.1-4% by weight of the comestible composition.

2. The method according to claim 1, in which the cellobiose is added at a weight proportion of from 0.5-4%.

3. The method according to claim 2, in which the cellobiose is added at a weight proportion of from 1-4%.

4. A sweetened comestible product comprising a sweetened comestible product base, a reduced proportion of low-intensity sweetener and a sweetness-enhancing proportion of cellobiose, wherein the sweetener in the sweetened comestible product consists of low-intensity sweetener, and wherein the comestible product comprises cellobiose at a weight proportion of from 0.1-4%.

5. The sweetened comestible product according to claim 4, comprising cellobiose at a weight proportion of from 0.5-4%.

6. The sweetened comestible product according to claim 5, comprising cellobiose at a weight proportion of from 1-4%.

* * * * *